United States Patent [19]

Siio et al.

[11] Patent Number: 5,239,287

[45] Date of Patent: Aug. 24, 1993

[54] TABLE EDITOR

[75] Inventors: Itiro Siio, Yokohama; Shigeki Ishikawa, Tokyo, both of Japan

[73] Assignee: International Business Machines Corporation, Armonk, N.Y.

[21] Appl. No.: 637,083

[22] Filed: Jan. 3, 1991

[30] Foreign Application Priority Data

Jan. 8, 1990 [JP] Japan ............................ 2-717

[51] Int. Cl.⁵ .............................................. G09G 3/02
[52] U.S. Cl. .................................... 340/706; 340/709
[58] Field of Search ............... 340/721, 724, 723, 706, 340/710, 709; 395/146, 144

[56] References Cited

U.S. PATENT DOCUMENTS

| | | | |
|---|---|---|---|
| 4,663,615 | 5/1987 | Hernandez et al. | 340/724 |
| 4,717,911 | 1/1988 | Matsuura et al. | 340/724 |
| 4,755,955 | 7/1988 | Kimura et al. | 340/724 |
| 4,802,104 | 1/1989 | Ogiso | 340/721 |
| 4,823,303 | 4/1989 | Terasawa | 340/724 |
| 4,931,987 | 6/1990 | Kawakami | 340/724 |

FOREIGN PATENT DOCUMENTS 60-251473 9/1985 Japan .
62-237494 8/1987 Japan .

OTHER PUBLICATIONS

Multiplan Version 2.

*Primary Examiner*—Alvin E. Oberley
*Assistant Examiner*—Xiao M. Wu
*Attorney, Agent, or Firm*—Mark S. Walker; William A. Kinnaman, Jr.

[57] ABSTRACT

A table editor for editing a table of rows and columns using a pointing device and display station. The table editor stores information about the lines and boxes that make up the table. A pointing device is used to select horizontal or vertical lines or a box defined by horizontal and vertical lines for an operation. The user can select a command to insert rows or columns, to delete rows or columns, or to concatenate the contents of two or more boxes. The determination of whether rows or columns are to be acted upon is made from the orientation of the lines selected by the pointing device.

7 Claims, 8 Drawing Sheets

BUTTON DOWN

BUTTON DOWN

BUTTON DOWN

TABLE EDITOR

BACKGROUND OF THE INVENTION

A. Field of the Invention

The present invention relates to a table editor for text processing and spread sheet processing, and more particularly a table editor that allows rows or columns to be inserted into or deleted from a table in a user-friendly manner.

B. Prior Art

In text processing and spread sheet processing, there often arise occasions in which it is necessary to insert or delete rows or columns in order to edit an existing table. In conventional techniques, as in Microsoft's MULTI-PLAN Version 2, it is usual to first pick a cell or box with a pointing device such as a mouse device, then to select either insertion or deletion, and then to specify the number of rows or columns. Thus, one or more rows or columns are inserted just under or at the right of the picked cell.

Almost the same technique applies on occasions when deletion is done. However, in such an arrangement, the user must know in advance where those rows or columns are inserted with respect of the picked cell, and therefore an inexperienced user might insert the rows in an incorrect position, or one line below. In such a mistake the rows could be inserted above the cell being picked Also, since the user is apt to confuse rows with columns, the user may select the wrong one. It is unadvisable to require the user to specify rows or columns, or R's or C's.

Patent applications relating to the present invention include a method wherein a starting point and an end point of a line are specified, and the line is drawn or deleted between them, thereby inserting or deleting rows (Published Unexamined Patent application No. 60-2514743); and a method wherein a point on an already drawn line is specified, then a direction is specified, and then another line beginning at the point in the line is generated to the outer frame (Published Unexamined Patent application No. 62-237494). However, these publications include no techniques for inserting or deleting rows or columns into or from a table in a user-friendly manner.

C. Problem to be Solved by the Present Invention

This invention, which is presented here with due consideration for the above-stated background, is intended to provide a user-friendly table creating system that is simple and definite in the designation of an inserting location and causes no confusion between rows and columns.

SUMMARY OF THE INVENTION

In order to achieve the above-mentioned purpose, this invention is designed to pick lines in a table for inserting or deleting a row or column. That is, when a row is inserted, the horizontal line in the inserting position, or the line between the two rows above and below the row to be inserted, is picked. Similarly, when a column is inserted, the vertical line between the two columns at the left and the right of the column to be inserted, is picked When a row is deleted, the lines above and below the row to be deleted are picked. When a column is deleted, the lines at the right and the left of the column to be deleted are picked. In such an arrangement, the line or lines define an inserting or deleting position, thereby enabling a row or column to be determined visually independent of the concepts of row and column and thus allowing specification of any such row or column more directly and accurately.

DETAILED DESCRIPTION OF THE PREFERRED EMBODIMENT

Figure 1:
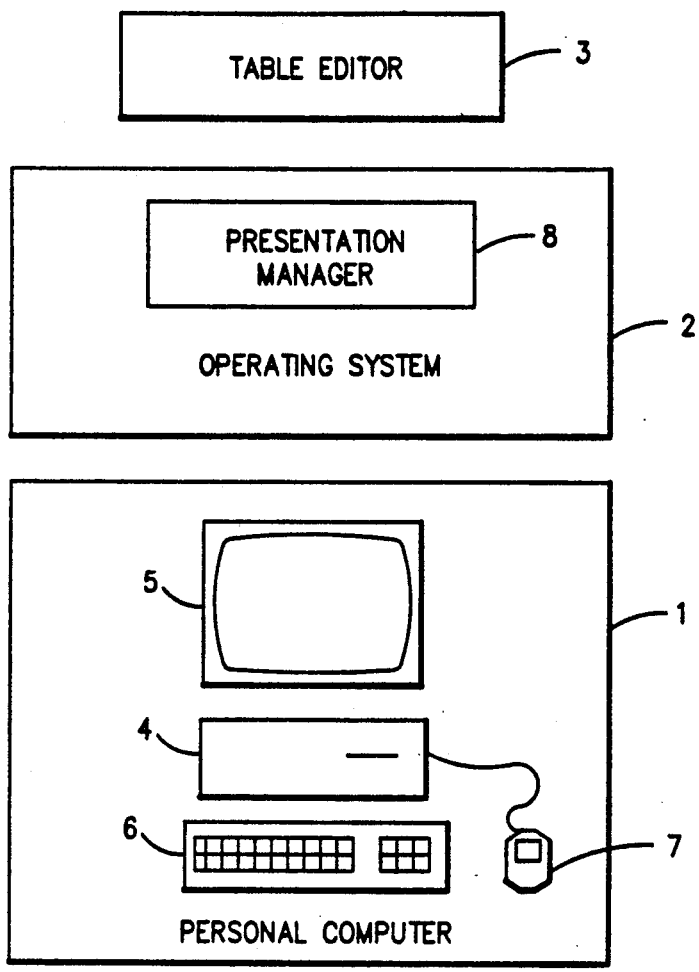
FIG. 1 is a general block diagram of the system of embodiment according to the present invention.

Referring now to the drawings, the preferred embodiment of the present invention will be explained.

FIG. 1 shows the overall system configuration of the embodiment. In FIG. 1, the system consists of a personal computer 1, an operating system 2, and a table editor 3. The personal computer 1 may be a PS/55 of IBM Japan, for example, which consists of a processor 4, a display device 5, a keyboard 6, and a mouse device 7. The operating system 2 may be an OS/55 of IBM Japan, for example, which includes a presentation manager 8 managing interaction between a display device 5 and a user. The presentation manager 8 also manages mouse cursor (pointer) information controlled by the mouse device 7. The table editor 3 is a feature that generates and edits a table according to directions inputted by the user.

Figure 2:
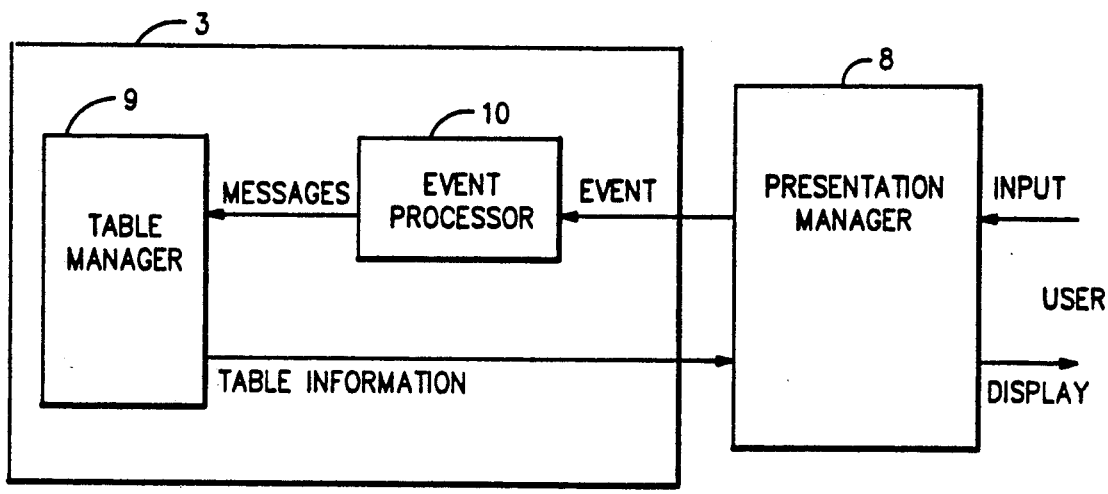
FIG. 2 is a block diagram showing the configuration of the table editor 3 in FIG. 1.

FIG. 2 illustrates the configuration of the table editor 3 in FIG. 1 in more detail. In FIG. 2, the table editor 3 consists of a table manager 9 and an event processor 10. The event processor 10 is designed to receive event information from the presentation manager 8, and to execute the processing routines shown in FIGS. 4A to 4F, which will be described later. The event processor 10 also controls drag flags indicating whether or not the mode is the drag mode used to move lines. The table manager 9 has the configuration shown in FIG. 3, which will be detailed later. In this configuration, when a user gives directions with the keyboard 6 or the mouse device 7, the presentation manager 8 in the operating system 2 generates event information according to the user's directions, and sends it to the event processor 10. The event processor 10 supplies messages based on the event information to the table manager 9 directing it to produce or modify table information. Then, the table manager 9 produces or modifies the table information in response to the messages, and returns it to the presentation manager 8, which then displays a revised table in accordance with said user's directions.

Figure 3:
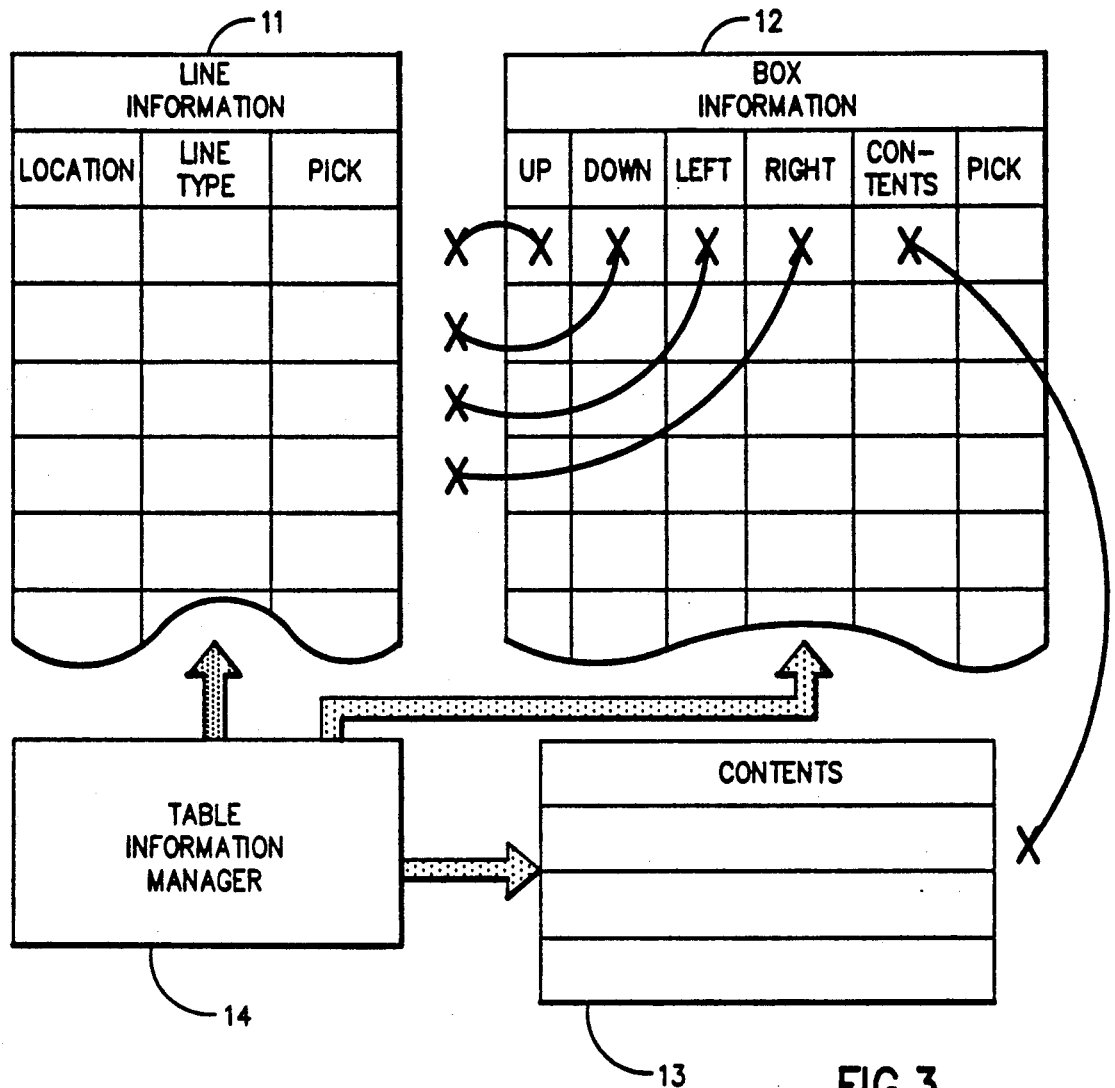
FIG. 3 is a configuration of the table manager 9 in FIG. 2.

FIG. 3 illustrates the configuration of the table manager 9 shown in FIG. 2 in more detail. In FIG. 3, the table manager 9 consists of a line information storage 11, a box information storage 12, a content information storage 13, and a table information manager 14. The line information storage 11 contains location information (the coordinates of starting points and end points of all the lines constituting a table, line type information, and pick flags (indicating whether or not lines are being picked). The box information storage 12 contains a information concerning four lines constituting a box, and the contents to be displayed in the box, that is, pointers to the line information storage 11 and the content information storage 13 which is described later. The box information storage 12 also contains pick flags (indicating certain boxes are being picked). The content information storage 13 stores the contents to be displayed in a box. The table information manager 14 manages the line information storage 11, box information storage 12, and content information storage 13.

The following describes the operation of the embodiment.

The table editor 3 creates and edits tables. Such a table usually consists of several vertical lines and horizontal lines as in FIG. 5. A field enclosed by four such lines, two vertical and two horizontal, is hereinafter called a box, as usually so designated. In the following, editing of a table is mainly explained because tables are created in a substantially similar manner to conventional table creation processes.

It will be first explained how the processing routines are executed on event information according to directions inputted by a user, and then insertion or deletion of rows and columns, and the concatenation of boxes will be explained.

Figure 4A:
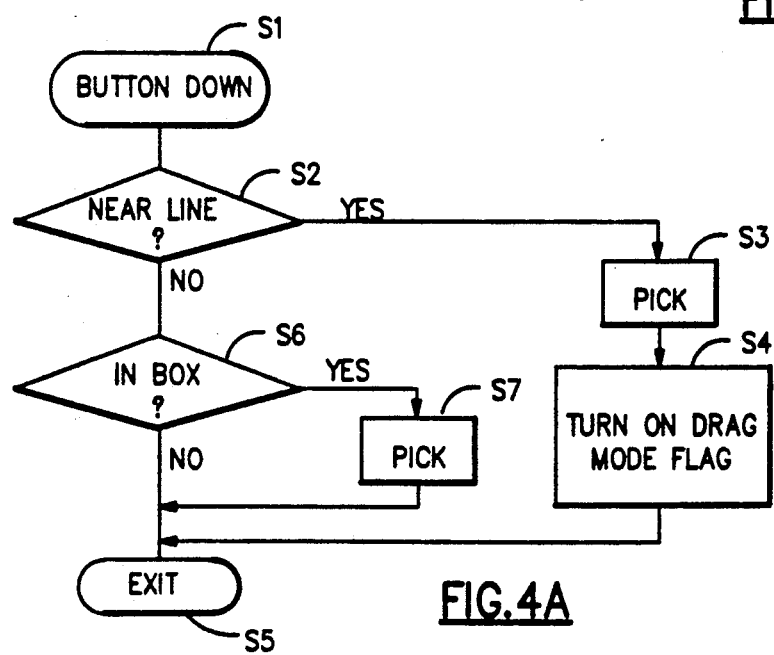
FIGS. 4A to 4F are flowcharts of the processing routines for the respective events in the embodiment.

Button-down Routine (FIG. 4A)

When a user presses a button on the mouse device 7, the presentation manager 8 sends button-down event information to the event processor 10 (step S1), together with mouse cursor (pointer) location information. The event processor 10 sequentially queries the table manager 9 to obtain line information, and runs a test as to whether or not the mouse cursor is near a line (step S2). If the mouse cursor is near a line, then the line is picked (step S3). That is, a pick flag is set at the corresponding line entry in the line information storage 11 of the table manager 9. Also, a flag for the drag mode, which is managed by the event processor 10, is turned on (step S4). Then, the routine is terminated (step S5). If it is judged at step 2 that the mouse cursor is not near a line, then a test is run as to whether or not the mouse cursor is in a box (step S6).

The test is also run by using the line information in the line information storage 11. If the mouse cursor is in a box, then the box is picked (step S7). That is, a pick flag is set at the corresponding box entry in the box information storage 12 of the table manager 9. Then, the routine is terminated (step S5). If the mouse cursor is not in a box, then the routine terminates at once (step S5).

Figure 4B:
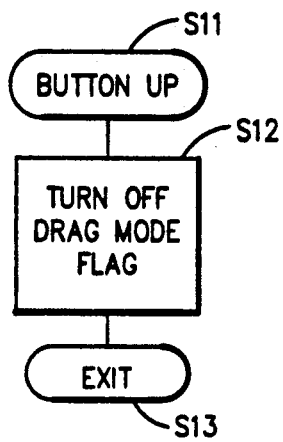

Button-up Routine (FIG. 4B)

If the user presses once a button on the mouse device 7, and then take his finger off the button, the button goes up to the original position. The presentation manager 8 then detects the button-up event and sends button-up event information to the event processor 10 (step S11). Then the event processor 10 resets the drag mode flag to the off position (step S12) and terminates the routine (step S13).

Figure 4D:
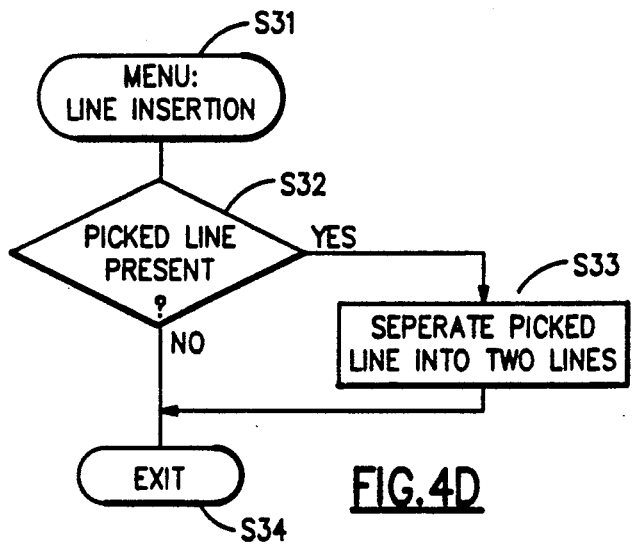
Figure 4C:
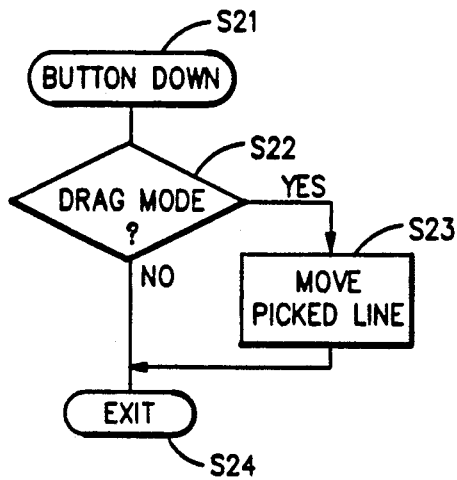

Move Routine (FIG. 4C)

If the user manipulates the mouse device 7 to move the mouse cursor, a move routine runs by increment of the location of the mouse cursor (step S21). This routine first tests whether or not the mode is in the drag mode (step S22). If it is in the drag mode, i.e. the drag mode flag is on, the line being picked at the moment, if any, is moved (step S23). That is, location information of the line is updated. Then, the routine is terminated (step S24). If it is not in the drag mode, then the routine terminates at once (step S24).

Menu/line Insertion Routine (FIG. 4D)

When the user picks the line insertion item in the edit menu field (pull-down menu), the presentation manager 8 sends line insertion event information to the event processor 10 (step S31). The event processor 10 then queries the pick information in the line information storage 11 (step S31). If there is a line being picked, the event processor 10 separates the line into two spaced lines (step S33), and then terminates the line insertion routine (step S34). If there is no line being picked, the routine terminates at once (step S34).

Figure 4E:
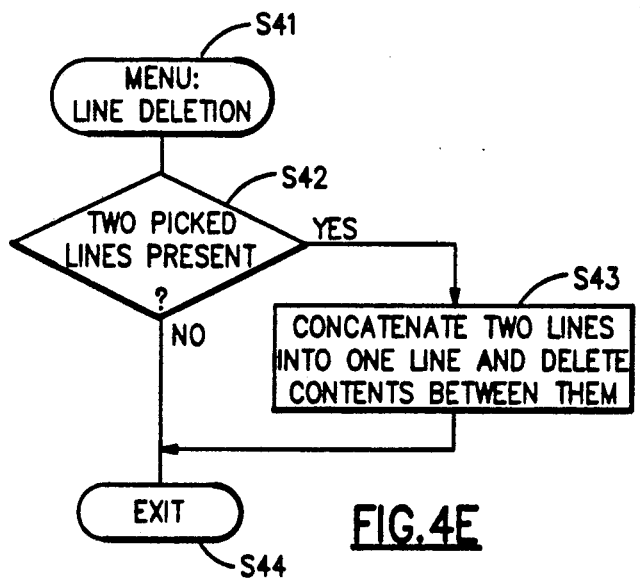

Menu/line Deletion Routine (FIG. 4E)

When the user picks the line deletion item in the edit menu field (pull-down menu), the presentation manager 8 sends line deletion event information to the event processor 10 (step S41). The event processor 10 then inquires pick information of the line information storage 11 (step S41). If there are two lines being picked, the event processor 10 concatenates the two lines into a single line, deletes the contents between the two lines (step S43), and terminates the line deletion routine (step S44). If two lines are not picked, the routine terminates at once (step S44).

Figure 4F:
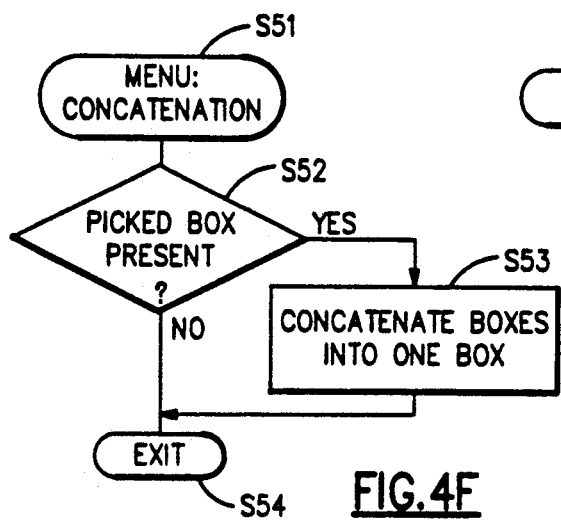
Figure 5A:
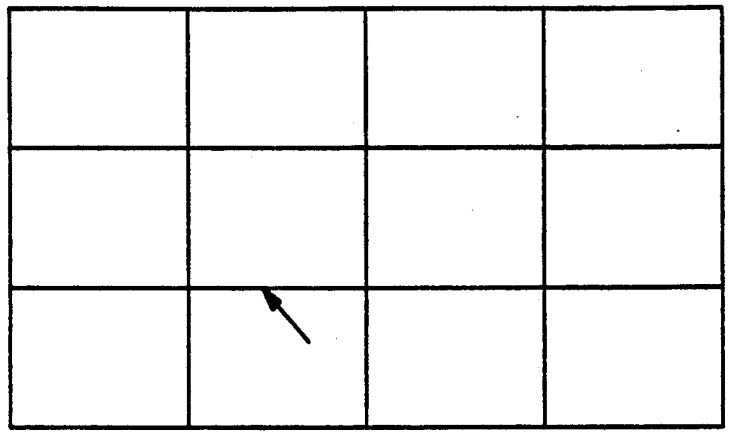
FIGS. 5A and 5D illustrate inserting a row.
Figure 5B:
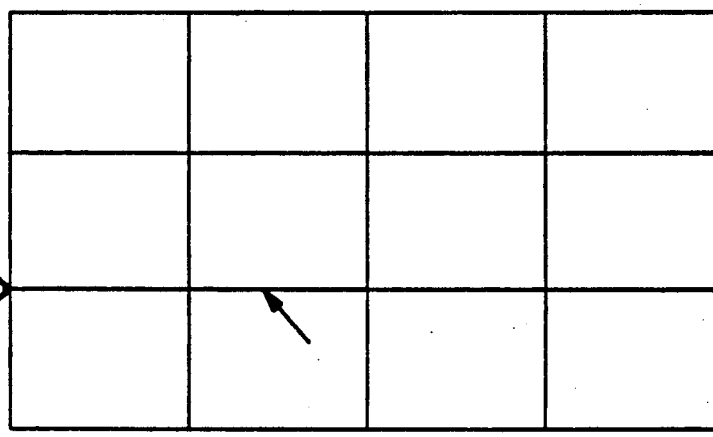
Figure 5C:
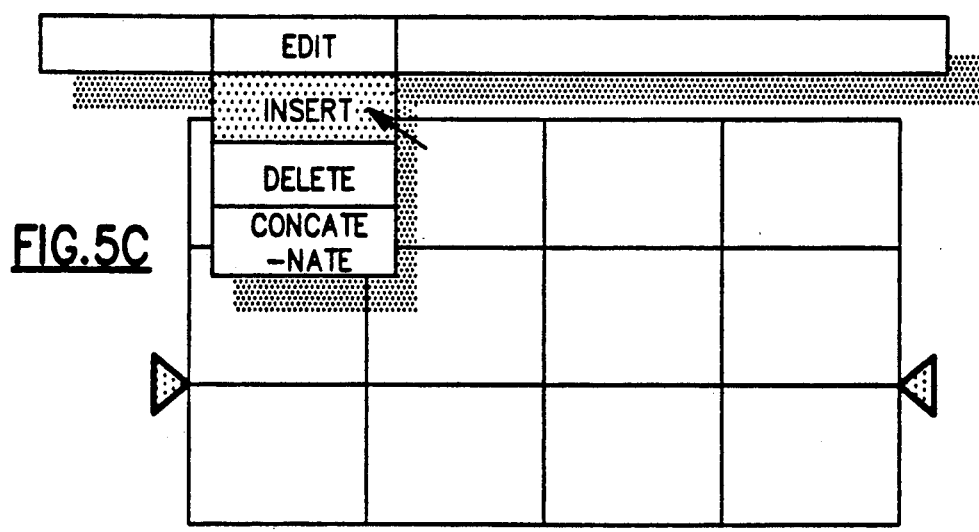
Figure 5D:
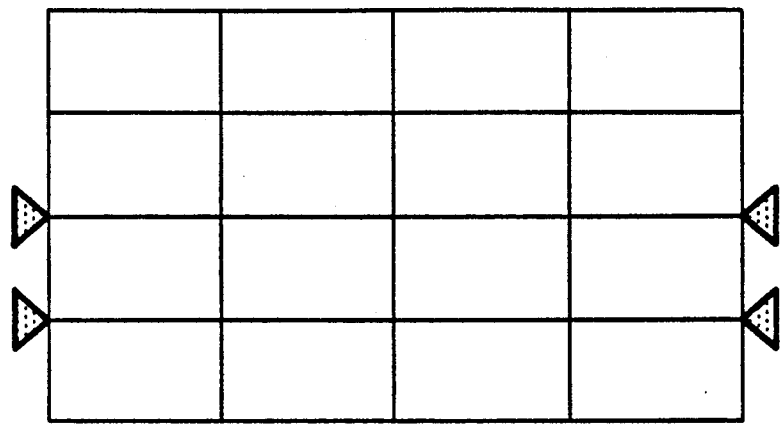

Menu/box Concatenation Routine (FIG. 4F)

When the user picks the box concatenation item in the edit menu field (pull-down menu), the presentation manager 8 sends box concatenation event information to the event processor 10 (step S51). The event processor 10 then queries the pick information in the box information storage 12 (step S51). If there are two or more boxes picked, the event processor 10 concatenates these two or more boxes into a single box (step S53), and thus hides away the lines between those boxes as hidden lines. To display such hidden lines, it is necessary only to specify the attribute "hidden line" for that area. Then the event processor 10 terminates the box concatenation routine (step S54). If fewer than two boxes are being picked, the routine terminates at once (step S54).

The following explains the insertion or deletion of rows and columns and the concatenation of boxes.

FIG. 5 illustrates how rows are inserted. In the example in FIG. 5, one row is inserted between the second row and the third row from the top. The mouse device 7 (FIG. 1) is first used to move the mouse cursor (the arrow mark in this example) on the line between the second and the third row as shown in (A). Then a button on the mouse device 7 is clicked to generate button-down event information, as shown in FIG. 4A. A pick flag is set in the line information for the corresponding line based on the button-down information. A triangular mark indicating the line being picked is displayed at each end of the picked line based on the flag (B). Then, the "Edit" item in the menu bar in the upper area of the screen (window) is picked to display a pull-down menu of edit items (C). Then, when the insertion item in the pull-down menu is picked, the presentation manager 8 sends line insertion event information to the event processor 10, and separates the corresponding line into two new lines as shown by four triangular marks in (D), between which a row is then inserted. In this example, both the vertical and the horizontal length of the outer frame of the table are fixed, and both the height of each row and the width of each column are constant. Accordingly, the height of each row in (D) is less than that of each row in (A) on account of the insertion of the row mentioned. As a matter of course, the height of the row to be inserted may be uniquely determined locationally in relation to that of the row just above or just below the row in question, or may be left to the user's decision.

Explanation of insertion of a column is omitted because it is the same as that of insertion of a row except that the line being picked is vertical.

Figure 6A:
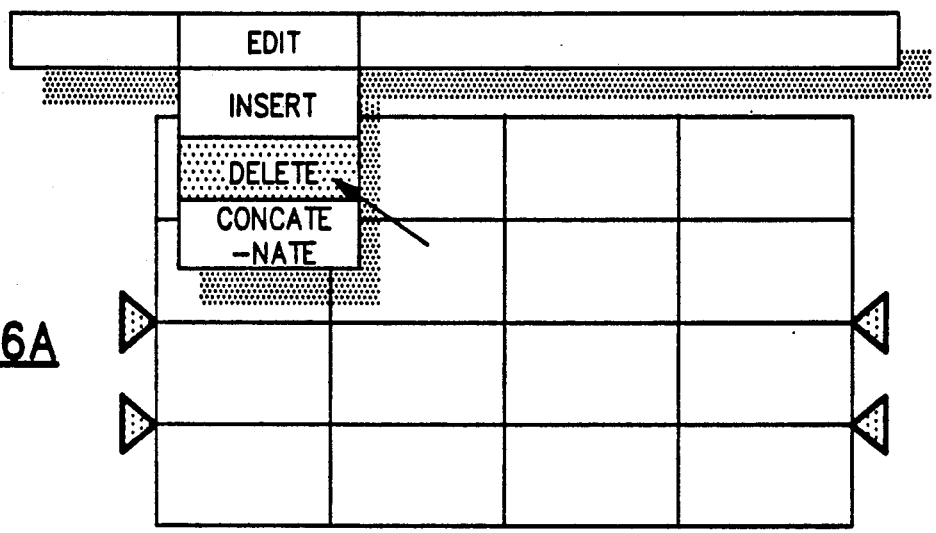
FIGS. 6A and 6B illustrate deleting a row.
Figure 6B:
Figure 6B:
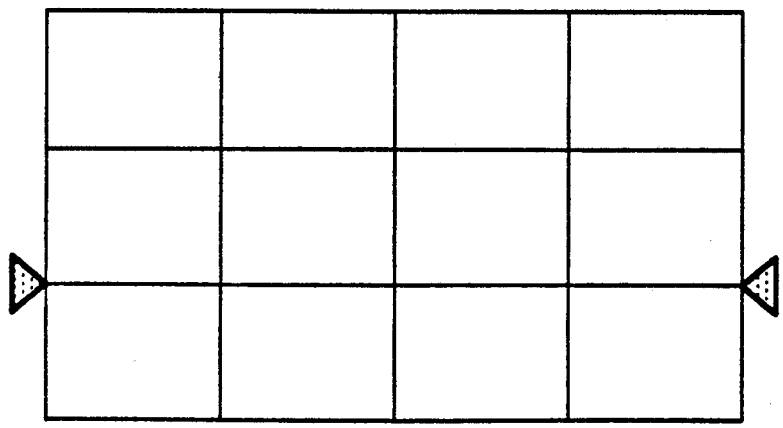
Figure 7A:
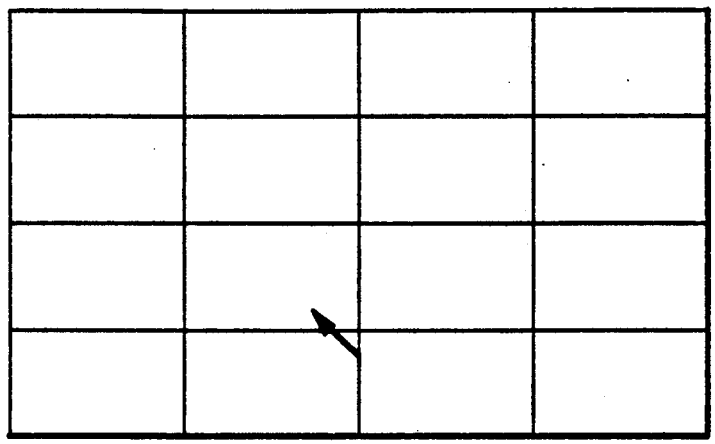
FIGS. 7A to 7F illustrate concatenating boxes.
Figure 7A:
Figure 7B:
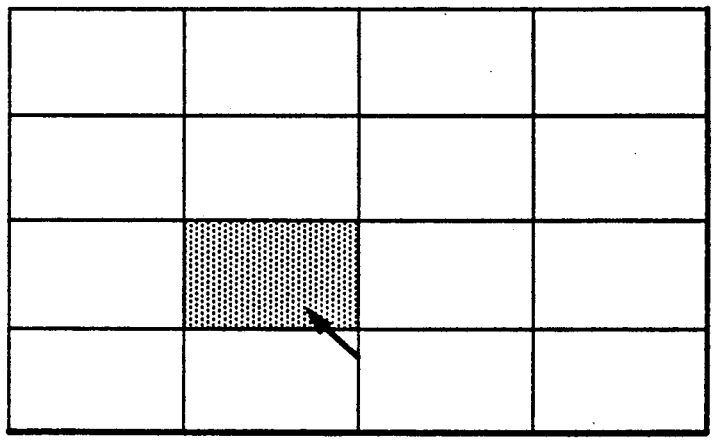
Figure 7C:
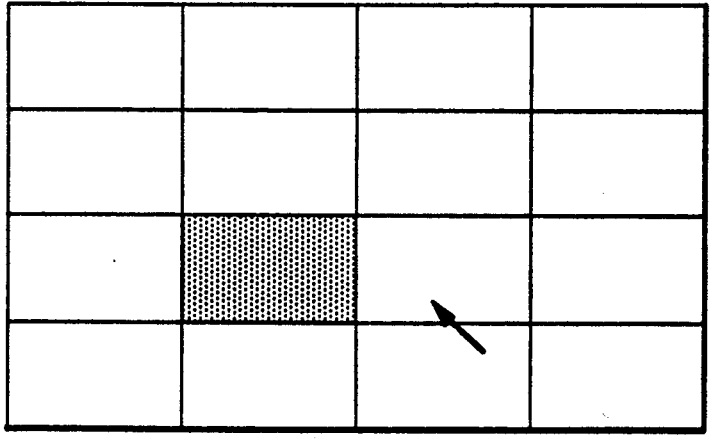
Figure 7C:
Figure 7D:
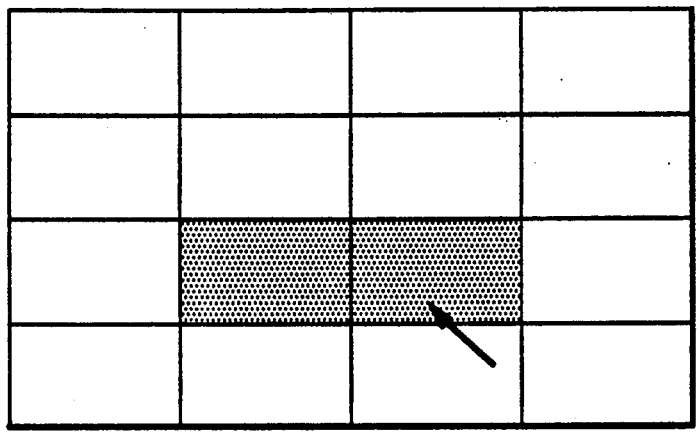
Figure 7E:
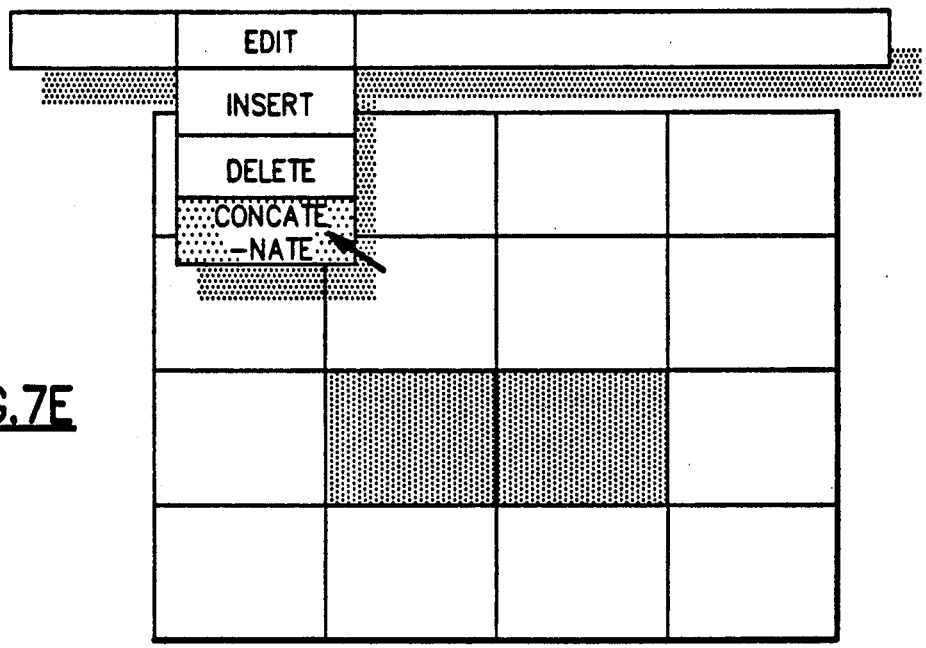
Figure 7F:
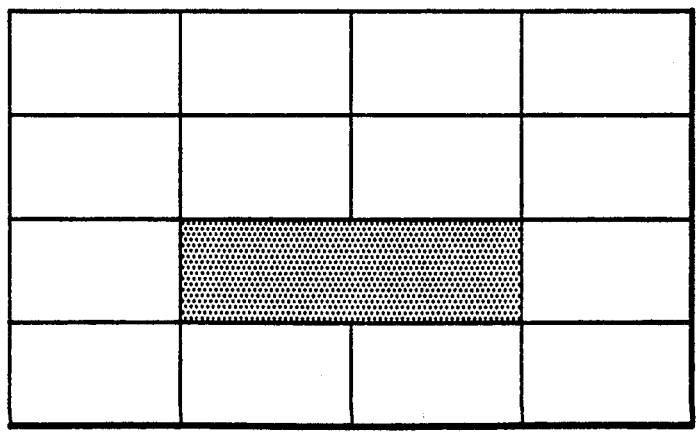

FIG. 6 illustrates how a row is deleted. With the example in FIG. 6, the third row from the top is deleted. The ruled lines just above and just below the row to be deleted are picked one after the other with the mouse device 7 (FIG. 1), similarly to the case shown in in FIG. 5. Thus, a pick flag is set on the lines just above and just below the row to the deleted. Then, a triangular mark is displayed at each end of the two lines based on the flag, as shown in (A), to indicate that they are picked. Then, the edit item in the menu bar in the upper area of the screen (window) is picked to display a pull-down menu of edit items. Then, when the deletion item in the pull-down menu is picked, the presentation manager 8 sends line deletion event information to the event processor 10, and concatenates the corresponding two lines into a single line using the routine shown in FIG. 4E, thus the row being deleted is as shown in (B).

Explanation of deletion of a column is omitted because it is the same as that of deletion of a row except that the line being picked is vertical.

FIG. 7 illustrates how boxes are concatenated. Using the example shown in FIG. 7, the box at the intersection of the third row and the second column and the box at the intersection of the third row and the third column are concatenated into a single box. The mouse device 7 (FIG. 1) is first used to move the mouse cursor into the box at the intersection of the third row and the second column, as shown in (A). Then, a button on the mouse device 7 is clicked to generate button-down event information of FIG. 4A. A pick flag is set in the box information for the corresponding box based on the button-down information, and the box is highlighted (B). Then, the mouse cursor is moved into the box at the intersection of the third row and the third column (C). A pick flag is set in the box information for the corresponding box in the same manner to highlight two picked boxes as shown in (D). Then, the edit item in the menu bar in the upper area row of the screen (window) is picked to display a pull-down menu of edit items (E). Then, when the box concatenation item in the pull-down menu is picked, the presentation manager 8 sends box concatenation event information to the event processor 10, which concatenates the corresponding two boxes into a single box by the routine shown in FIG. 4F (F).

Figure 8A:
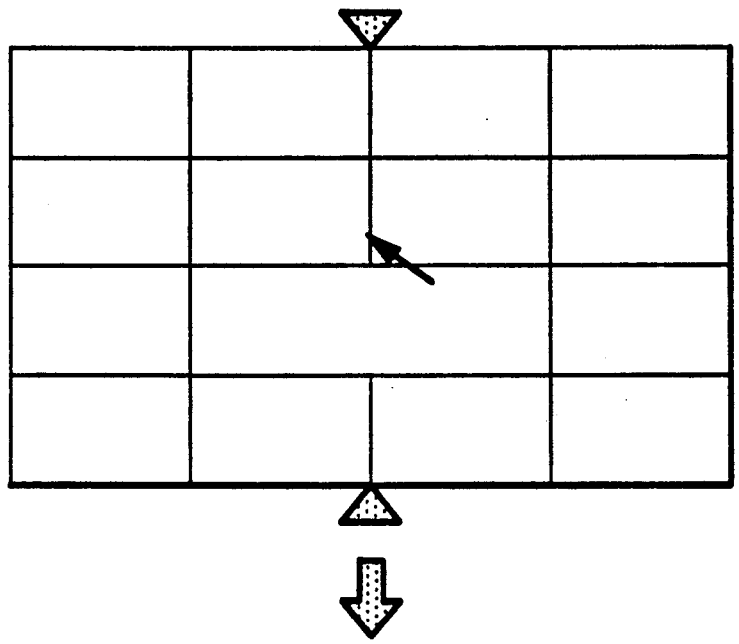
FIGS. 8A and 8B illustrate a manner for moving a line.
Figure 8B:
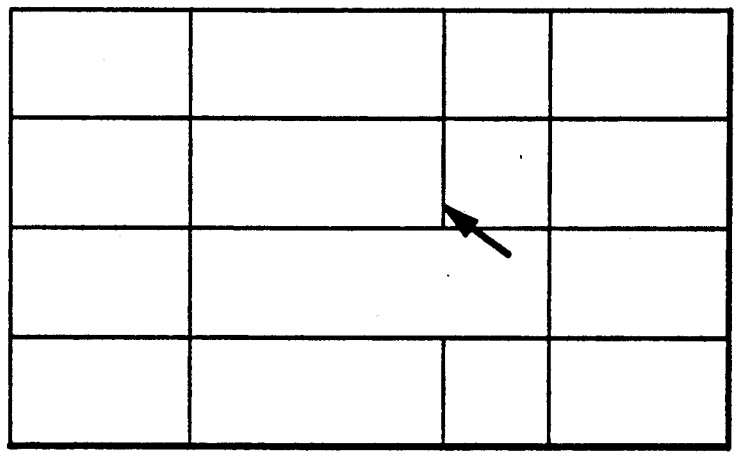

FIG. 8 illustrates how a line is moved (dragged). In this example, the third vertical line from the left is dragged In this example, the box at the intersection of the third row and the second column and the box at the intersection of the third row and the third column have already been concatenated according to the example of FIG. 7. For this reason, part of the third line has been hidden.

First, the mouse device 7 (FIG. 1) is used to move the mouse cursor onto the third line from the left, as shown in (A). Then, a button on the mouse device 7 is pressed to generate button-down event information, as shown in FIG. 4A. A pick flag is set in the line information for the corresponding line based on the button-down information. Then, a triangular mark is displayed at each end of the picked line based on the flag, as shown in (A) to indicate that it is picked. Furthermore, a drag mode flag is set (turned on) based on the button-down information. The drag mode flag is kept ON until button-up event information is generated, as shown in FIG. 4B. Then, when the mouse device 7 is moved with the button of the mouse device 7 down, the move routine is executed repeatedly based on the move event information of FIG. 4C, thus the picked line is moved. The line visually is discontinued on the third row, but the upper partial line and the lower partial line move together with each other (B) because the line is a ruled line partially having the attribute of a "hidden line."

The present invention is not limited to the above-mentioned embodiment, but is capable of being embodied in various variations. For example, even where all lines are hidden lines, this invention can be applied to insert rows and columns. Moreover, needless to say, pointing devices other than the mouse device 7 may be used.

F. Advantages of the Invention

As has been described so far, the present invention enables insertion locations to be specified simply and also allows operations to be performed freely irrespective of the concepts of row and column, inasmuch as the line between the rows just above and just below an inserting location is picked when a row is inserted, and the line between the columns at the left and the right of an inserting location is picked when a column is inserted. Also, this invention simplifies the deletion of rows and columns because it allows such deletion of rows and columns to be specified by picking lines.

We claim:
1. A table editor comprising:
a display device;
line information storage means for storing line information indicative of a plurality of graphic lines defining a plurality of boxes defining a table;
content storage means containing information to be displayed in each of said plurality of boxes;
pointing mark information storage means for storing pointing mark information indicative of a pointing mark;
means for displaying said table and said pointing mark on said display device based on the line information in said line information storage means and the pointing mark information in said pointing mark information storage means;
location pointing means for updating the pointing mark information in said pointing mark information storage means to direct a location of said pointing mark;
means for generating a line identifying a line pointed to by said pointing mark based on said pointing mark information and said line identifying command;
means for generating an insertion command; and
means for updating the line information in said line information storage means so that, if a line identified by said line identification means is located between two consecutive rows of boxes, one or more new lines and one or more new rows of boxes are inserted, in response to said insertion command, and so that, if a line identified by said line identification means is located between two consecutive columns of boxes, one or more new lines and one or more new columns of boxes are inserted in response to said insertion command.

2. A table editor according to claim 1, wherein said location pointing means is a mouse device.

3. A table editor according to claim 1 wherein said line information updating means updates the line information in said line information storage means so as to insert a specified number of rows or columns.

4. A table editor according to claim 3, wherein said line information updating means updates the line information in said line information storage means so as to arrange existing rows or columns and rows or columns being inserted evenly within a frame having a predetermined size.

5. A table editor according to claim 3, wherein said line information updating means updates the information in said line information storage means so as to insert rows or columns of boxes having specified sizes.

6. A table editor comprising:
a display device;
line information storage means for storing line information indicative of a plurality of graphic lines defining a plurality of boxes defining a table;
content storage means containing information to be displayed in each of said plurality of boxes;
pointing mark information storage means for storing pointing mark information indicative of a pointing mark;
means for displaying said table and said pointing mark on said display device based on the line information in said line information storage and the pointing mark information in said pointing mark information storage means;
location pointing means for updating the pointing mark information in said pointing mark information storage means to direct a location of said pointing mark;
means for generating an insertion command; and
means for updating the line information in said line information storage means so that, if said pointing mark points to a line between two consecutive rows of boxes when said insertion command is generated, one or more new lines and one or more new rows of boxes are inserted, in response to said insertion command, and so that, if said pointing mark points to a line between two consecutive columns of boxes when said insertion command is generated, one or more new lines and one or more new columns of boxes are inserted in response to said insertion command.

7. A table editor comprising:
a display device;
line information storage means for storing line information indicative of a plurality of graphic lines defining a plurality of boxes defining a table;
content storage means containing information to be displayed in each of said plurality of boxes;
pointing mark information storage means for storing pointing mark information indicative of a pointing mark;
means for displaying said table and said pointing mark on said display device based on the line information in said line information storage and the pointing mark information in said pointing mark information storage means;
location pointing means for updating the pointing mark information in said pointing mark information storage means to direct a location of said pointing mark;
means for generating a line identifying command;
line identification means for identifying a line pointed to by said pointing mark based on said pointing mark information and said line identifying command;
means for generating a deletion command; and
means for updating the line information in said line information storage means so that, if two lines identified by said line identification means are located around one or more rows of boxes, one or more lines and one or more rows of boxes between said two lines are deleted in response to said deletion command, and so that, if two lines identified by said line identification means are located around one or more columns of boxes, one or more lines and one or more columns between said two lines are deleted in response to said deletion command.

* * * * *